(12) United States Patent
Ikeda et al.

(10) Patent No.: US 12,388,070 B2
(45) Date of Patent: Aug. 12, 2025

(54) MANUFACTURING METHOD FOR WET GRANULAR BODY OF ELECTRODE ACTIVE MATERIAL MIXTURE, MANUFACTURING METHOD FOR ELECTRODE PLATE, WET GRANULAR BODY OF ELECTRODE ACTIVE MATERIAL MIXTURE, AND MANUFACTURING APPARATUS FOR WET GRANULAR BODY OF ELECTRODE ACTIVE MATERIAL MIXTURE

(71) Applicant: PRIME PLANET ENERGY & SOLUTIONS, INC., Tokyo (JP)

(72) Inventors: Takenori Ikeda, Owariasahi (JP); Yusuke Wakabayashi, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 629 days.

(21) Appl. No.: 17/579,870

(22) Filed: Jan. 20, 2022

(65) Prior Publication Data
US 2022/0263056 A1    Aug. 18, 2022

(30) Foreign Application Priority Data

Feb. 16, 2021    (JP) .................................. 2021-022617

(51) Int. Cl.
*H01M 4/04*    (2006.01)
*H01M 4/36*    (2006.01)

(52) U.S. Cl.
CPC ......... *H01M 4/0435* (2013.01); *H01M 4/364* (2013.01)

(58) Field of Classification Search
None
See application file for complete search history.

(56) References Cited

U.S. PATENT DOCUMENTS

2003/0020200 A1    1/2003    Hashimoto et al.
2005/0013893 A1    1/2005    Hashimoto et al.
(Continued)

FOREIGN PATENT DOCUMENTS

CN    109755494 A    5/2019
ES    2 240 575 T3    10/2005
(Continued)

OTHER PUBLICATIONS

Tatsuya Tanaka et al., "Changes of the Mixing Technology/System by a Twin Screw Extruder and Application to Nano Filler Dispersion Techniques", Bando Technical Report No. 18/2014, pp. 2-8 (2014).

(Continued)

*Primary Examiner* — Tracy M Dove
(74) *Attorney, Agent, or Firm* — Finnegan, Henderson, Farabow, Garrett and Dunner LLP

(57) ABSTRACT

There are provided a method for manufacturing a wet granular body of an electrode active material mixture from which granular bodies with almost uniform grain size can be obtained, the wet granular body itself, a method for manufacturing an electrode plate using the same, and a manufacturing apparatus for the same. There are provided mixing of obtaining a wet powder body in a pendular state in which solid-matter powder includes at least electrode active material powder and conductive material powder, liquid components exist in facing portions of solid powder but the liquid components are not linked one another in the facing portions, and spaces among the solid powder are entirely linked, and granulating of obtaining an assembly of the wet granular body of the electrode active material mixture by forming the wet powder obtained in the mixing process into grains.

2 Claims, 5 Drawing Sheets

(56) References Cited

U.S. PATENT DOCUMENTS

| | | | |
|---|---|---|---|
| 2018/0145309 A1* | 5/2018 | Akiyama | B01F 27/171 |
| 2018/0287141 A1* | 10/2018 | Kurita | H01M 4/587 |
| 2019/0036104 A1* | 1/2019 | Hirukawa | H01M 4/0435 |
| 2019/0131628 A1 | 5/2019 | Sugihara | |
| 2020/0023327 A1 | 1/2020 | Ikeda | |
| 2020/0136125 A1 | 4/2020 | Suenaga et al. | |
| 2020/0161711 A1* | 5/2020 | Hayashi | H01M 4/0409 |
| 2021/0020948 A1 | 1/2021 | Sugihara | |

FOREIGN PATENT DOCUMENTS

| | | |
|---|---|---|
| JP | S-52-12680 A | 1/1977 |
| JP | H-04-281832 A | 10/1992 |
| JP | 2015-032554 A | 2/2015 |
| JP | 2017-104784 A | 6/2017 |
| JP | 2018-137087 A | 8/2018 |
| JP | 2019-106311 A | 6/2019 |
| JP | 2020-013681 A | 1/2020 |
| KR | 10-2003-0012790 A | 2/2003 |
| KR | 10-2019-0139855 A | 12/2019 |

OTHER PUBLICATIONS

Tsuyoshi Hirajima et al., "Agglomeration in Liquid and Its Application", Shigen-to-Sozai, vol. 110, pp. 595-600 (1994).

* cited by examiner

MANUFACTURING METHOD FOR WET GRANULAR BODY OF ELECTRODE ACTIVE MATERIAL MIXTURE, MANUFACTURING METHOD FOR ELECTRODE PLATE, WET GRANULAR BODY OF ELECTRODE ACTIVE MATERIAL MIXTURE, AND MANUFACTURING APPARATUS FOR WET GRANULAR BODY OF ELECTRODE ACTIVE MATERIAL MIXTURE

CROSS-REFERENCE TO RELATED APPLICATIONS

This application is based upon and claims the benefit of priority from the prior Japanese Patent Application No. 2021-022617, filed Feb. 16, 2021, the entire contents of which are incorporated herein by reference.

BACKGROUND

Technical Field

The present disclosure relates to a wet granular body of an electrode active material mixture, and other than the wet granular body itself, relates to a manufacturing method for the wet granular body, a manufacturing method for an electrode plate using the wet granular body, and a manufacturing apparatus for the wet granular body.

Background Art

Heretofore, an electrode plate for a battery has been presented by laminating an electrode active material and its additive material on a surface of a current collecting foil to be in a thin-layer form. For this film formation, usually, a mixture, in which a powder component such as the electrode active material and the additive material is mixed with a liquid component, is applied on the surface of the current collecting foil. Especially in recent years, in response to the request of reducing a burden in a drying step after the film formation, the mixture has been granulated for use with reducing the liquid component as much as possible. In the technique of JP2020-013681A, the mixture is arranged to have a solid content ratio such that the mixture is formed to be in a clay-like state.

SUMMARY

Problems to be Solved

The above-mentioned conventional technique has the following problem. Depending on a compounding ratio of the mixture, the mixture is hard to be in the clay-like state. Especially when a conductive material as one type of the additive material is high in its compounding ratio, the clay-like mixture hardly tends to be obtained. The reason for this is assumed that the conductive material easily absorbs the liquid component. Therefore, when the mixture has the high compounding ratio of the conductive material, the mixture fails to be in the clay-like state and results in a state which is not so different from a state of dry powder body. That is why the granular mixture with uniform grain size cannot be obtained. Increasing the amount of the liquid component is one option, but it would increase a burden in the drying step after the film formation.

The present disclosure has been made to solve the above-mentioned problem of the conventional technique. Namely, the problem to be solved is to provide a method for manufacturing a wet granular body of an electrode active material mixture in which granular bodies have almost uniform grain size irrespective of a compounding ratio of a conductive material. In addition, the present disclosure provides the wet granular body itself, a manufacturing method for an electrode plate using the wet granular body, and a manufacturing apparatus for the wet granular body.

Means for Solving the Problems

A manufacturing method for a wet granular body of an electrode active material mixture in one aspect of the present disclosure is a method for manufacturing a wet granular body of an electrode active material mixture, the method comprising: mixing solid-matter powders including at least electrode active material powder and conductive material powder with liquid component to obtain a wet powder body in a pendular state in which the liquid component exists at facing portions of the solid-matter powder, the liquid component at the facing portions are not linked to one another, and vacancy among the solid-matter powders continues as a whole; and granulating to form the wet powder body obtained in the mixing into grains to obtain an assembly of wet granular bodies of the electrode active material mixture.

In the method for manufacturing the wet granular body of the electrode active material mixture according to the above aspect, in the mixing, the wet powder body with less fluidity in the pendular state including the electrode active material powder, the conductive powder, and the liquid component is obtained. In the granulating, the above-mentioned wet powder body in the pendular state is formed to obtain the wet granular body of the electrode active material mixture. This granular body is appropriate for formation of a layer of the electrode active material mixture for an electrode plate.

In the method for manufacturing the wet granular body of the electrode active material mixture according to the above aspect, preferably, the granulating includes: bar-like shape forming to form the wet powder body into a bar-like shape, and granular shape cutting to cut the wet powder body, which has been formed into the bar-like shape, to grains at plural points in a longitudinal direction of the wet powder body. The wet powder body is thus firstly formed into the bar-like shape and then cut into grains, so that the wet granular bodies with uniform grain size can be obtained and can be used preferably for manufacturing the electrode plate.

In the method for manufacturing the wet granular body of the electrode active material mixture according to the above aspect, preferably, the bar-like shape forming including: plate-like shape forming to form the wet powder body into a plate-like shape; and bar-like shape cutting to cut the wet powder body, which has been formed into the plate-like shape, to be in the bar-like shape along plural cutting lines arranged parallel to one another. The wet powder body is thus firstly formed into a plate-like shape and then cut into pieces of a bar-like shape, so that the bar-like wet powder bodies with uniform thickness can be obtained and can be used for formation of the wet granular body.

A method for manufacturing an electrode plate according to another aspect of the present disclosure is a method for manufacturing an electrode plate having layers of wet body of an electrode active material mixture on a current collecting foil, the method using a three-piece roller including a first roller, a second roller, and a third roller, the three-piece roller configured such that the second roller faces both the first roller and the third roller, the first roller and the third roller are not facing each other, and the current collecting foil is placed on the third roller to pass through facing portions of the second roller and the third roller, the method comprising: layer forming to form a laminated layer of a wet granular body on a surface of the second roller by supplying the wet granular body of the electrode active material mixture to pass through facing portions of the first roller and the second roller; and transferring to transfer the layer from the surface of the second roller to a surface of the current collecting foil while the layer is passing through the facing portions of the second roller and the third roller, wherein the method uses a body manufactured by the above-mentioned method as the wet granular body of the electrode active material mixture. Herein, as the wet granular body of the electrode active material mixture, the one manufactured by the method for manufacturing the wet granular body of the electrode active material mixture according to any one of the above aspects is used. Accordingly, the electrode plate can be preferably manufactured from the wet powder body with less fluidity.

A wet granular body of an electrode active material mixture according to another aspect of the present disclosure is a wet granular body of an electrode active material mixture manufactured by the above-mentioned method. This wet granular body is suitable for manufacturing the electrode plate.

A manufacturing apparatus of a wet granular body of electrode active material mixture according to another aspect of the present disclosure is a manufacturing apparatus of a wet granular body of an electrode active material mixture configured such that: the manufacturing apparatus includes a first roller and a second roller facing each other to rotate; at least any one of the first roller and the second roller is a blade-equipped roller formed on its surface with a plurality of circumferential grooves and protruding portions, each of which is of a blade-like shape and is formed between the respective grooves; the first roller and the second roller are configured to rotate at different peripheral speeds; and a bar-like formed product of the wet granular body of the electrode active material mixture supplied to facing portions of the first roller and the second roller is cut into grains by the protruding portions of the blade-equipped roller. By this apparatus, the bar-like formed product of the wet powder body of the electrode active material mixture that is supplied to the facing portions of the first roller and the second roller is cut into grains by the protruding portions of the blade-equipped rollers.

According to the present disclosure, there are provided a method for manufacturing a wet granular body of an electrode active material mixture by which granular bodies with almost uniform grain size can be obtained irrespective of a compounding ratio of a conductive material, the wet granular body itself, a manufacturing method for an electrode plate using the wet granular body, and a manufacturing apparatus for the wet granular body.

DETAILED DESCRIPTION OF THE EXEMPLARY EMBODIMENTS

An embodiment embodying the present disclosure is explained in detail below with reference to the accompanying drawings. The present embodiment is an embodiment of the present disclosure related to a wet powder body of an electrode active material mixture used for a positive electrode plate of a lithium-ion battery.

Solid components of raw material for a positive active material mixture in the present embodiment are particulate powder materials listed below.

Active material: lithium nickel-manganese-cobalt-oxide (with a particle diameter of about 10 μm)
Conductive material: acetylene black (with a particle diameter of about 3 to 5 nm)
Binder resin: polyvinylidene fluoride
Compounding ratio: active material/conductive material/binder resin=90/5/5 (weight percent)

In the above materials, the binder resin is to be dissolved into disperse medium when the binder resin is mixed with the disperse medium. Accordingly, in the following explanation, the binder resin is deemed to be substantially included in the disperse medium. As the disperse medium, N-Methyl-2-pyrrolidone (NMP) is used, and a solid content ratio is prescribed as 6.4 weight percent. This value of the solid content ratio is much enough for a mixture to become wet powder with less fluidity.

A process of manufacturing the positive active material mixture in the present embodiment is as follows.

(1) Mixing→(2) Granulating→(3) Film-forming

The mixing (the mixing process) in the above (1) is a process of mixing the powder material with the disperse medium. In this process, it is preferable not to leave a condensed matter, in which powder particles are condensed in a block-like state, in the mixture. For example, two-step mixing process can be performed such that preliminary mixing by use of a general mixer such as a planetary mixer is firstly performed, and after that, the mixture passes through a paired-roller apparatus to eliminate the condensed matter. In this manner, the wet powder body, namely, the electrode active material mixture having high uniformity owing to facilitated disperse can be obtained.

In the present embodiment, a mixture in a so-called pendular state is produced by the mixing process. The pendular state means that a state of liquid component and vacancy in the mixture meet the following conditions (see FIG. 1).

Liquid component 2 exists only at facing portions of solids 1 (individual powder) and have no link with the liquid components 2 at other facing portions.

Vacancy 3 among the solids 1 continues in three dimensions over the entire mixture.

Figure 2:
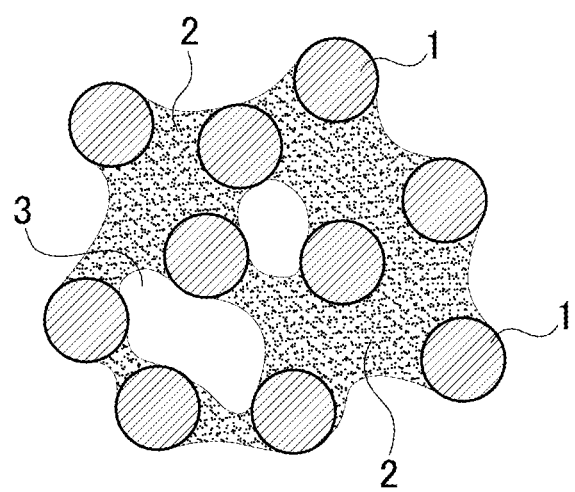
FIG. 2 is a diagram showing a funicular state.

The pendular state is a state with higher solid content ratio than a funicular state which meets the following conditions (see FIG. 2).

The liquid component 2 exists not only between the facing portions of the solids 1 but also at portions other than the facing portions of other solids 1 on surfaces of the solids 1. Thus, the liquid component 2 continues over the entire mixture.

There are vacant areas 3 among the solids 1, but the vacant areas 3 are not necessarily linked to one another, and there are portions where the vacant areas 3 are intercepted by the liquid component 2.

Figure 1:
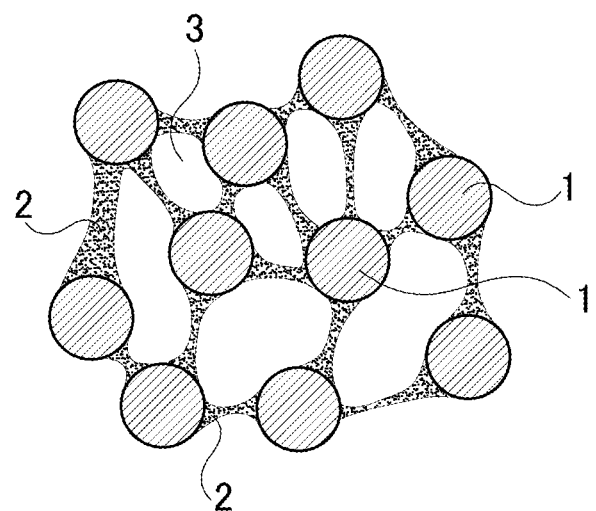
FIG. 1 is a diagram showing a pendular state.

Both the above-mentioned pendular state and the funicular state are in a wet-powder state with less fluidity as compared with a mixture in a slurry state or in a capillary state (a clay-like state). In the present embodiment, the solid content ratio has been decided so that the solids 1 and the liquid component 2 are in the pendular state in which the liquid components exist less than in the funicular state among these two states. In FIG. 1 and FIG. 2, it is illustrated as if the solids 1 of only one type exist, but actually, there are a plurality of types of solids exist as mentioned above.

The granulating (the granulating process) in (2) is a process of forming the wet powder body as the mixture obtained in the mixing process in (1) into grains to obtain wet granular bodies of the electrode active material mixture. The granulating process of the present embodiment is carried out by the following steps.

Figure 3:
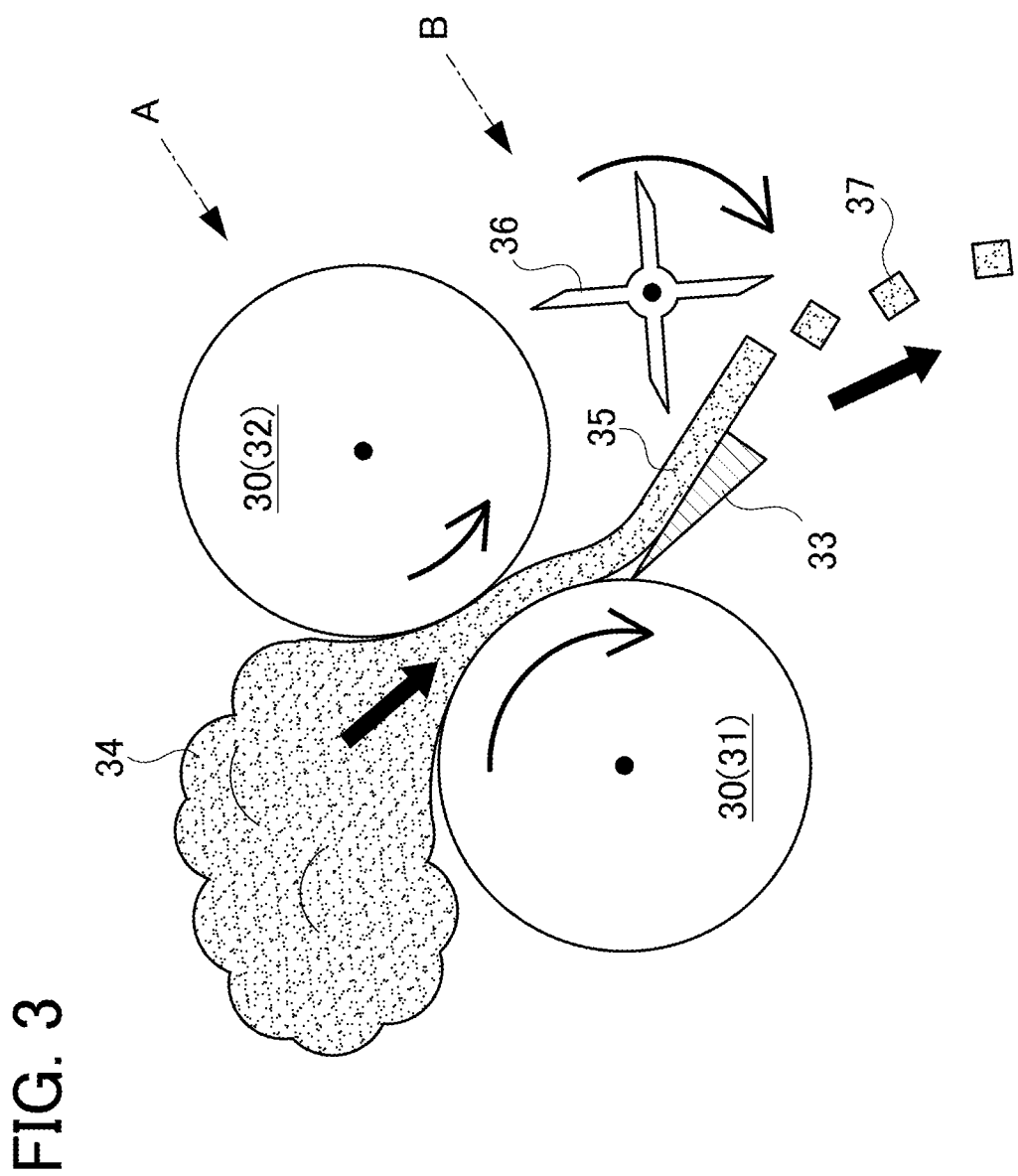
FIG. 3 is a sectional view showing a plate-like shape forming process and a bar-like shape cutting process in an embodiment.

(2-1) Plate-like shape forming→(2-2) Bar-like shape cutting→(2-3) Grain-like shape cutting The plate-like shape forming in (2-1) is a process of forming the wet powder body into a plate-like shape. As indicated by an arrow A in FIG. 3, this process is performed by use of a paired-roller-equipped apparatus 30. The paired-roller-equipped apparatus 30 is configured such that two rollers 31 and 32 rotating in the forward direction at different peripheral speeds. A scraper 33 is abutted on the roller 31 which rotates with a faster peripheral speed. The scraper 33 is in contact with a point of the roller 31 on a downstream side of the facing portion with the roller 32 in a rotation direction.

In the paired-roller-equipped apparatus 30, an assembly 34 of the wet powder body is supplied to the facing portions of the two rollers 31 and 32 from an upstream side of the rotation direction. The assembly 34 is dragged into the facing portions and formed, and thus a plate-like formed product 35 of the wet powder body is obtained on the downstream side of the facing portions. The plate-like formed product 35 proceeds on the roller 31 having the faster peripheral speed and then is scraped off from the roller 31 by the scraper 33. A thickness of the plate-like formed product 35 is similar to a width of a gap between the facing portions of the rollers 31 and 32. This gap is preferably arranged almost same with a diameter of the wet granular body which is to be finally obtained. By the above-mentioned method, even if the mixture is in the pendular state with poor fluidity, the plate-like formed product 35 with a desired thickness can be stably obtained.

The bar-like shape cutting in (2-2) is a process of cutting the plate-like formed product 35 into bar-like pieces. This process is performed by use of a rotary cutter 36 as indicated with an arrow B in FIG. 3. The rotary cutter 36 is configured with strip-shaped numerous cutters each of which has an edge facing radially outward and has a basal end connected to one another. The rotary cutter 36 is placed in a position where the plate-like formed product 35 that has been scraped off by the scraper 33 comes to contact. The rotary cutter 36 rotates to cut the plate-like formed product 35 along cutting lines 38 at plural points parallel to one another, and thus bar-like formed products 37 are obtained.

Figure 4:
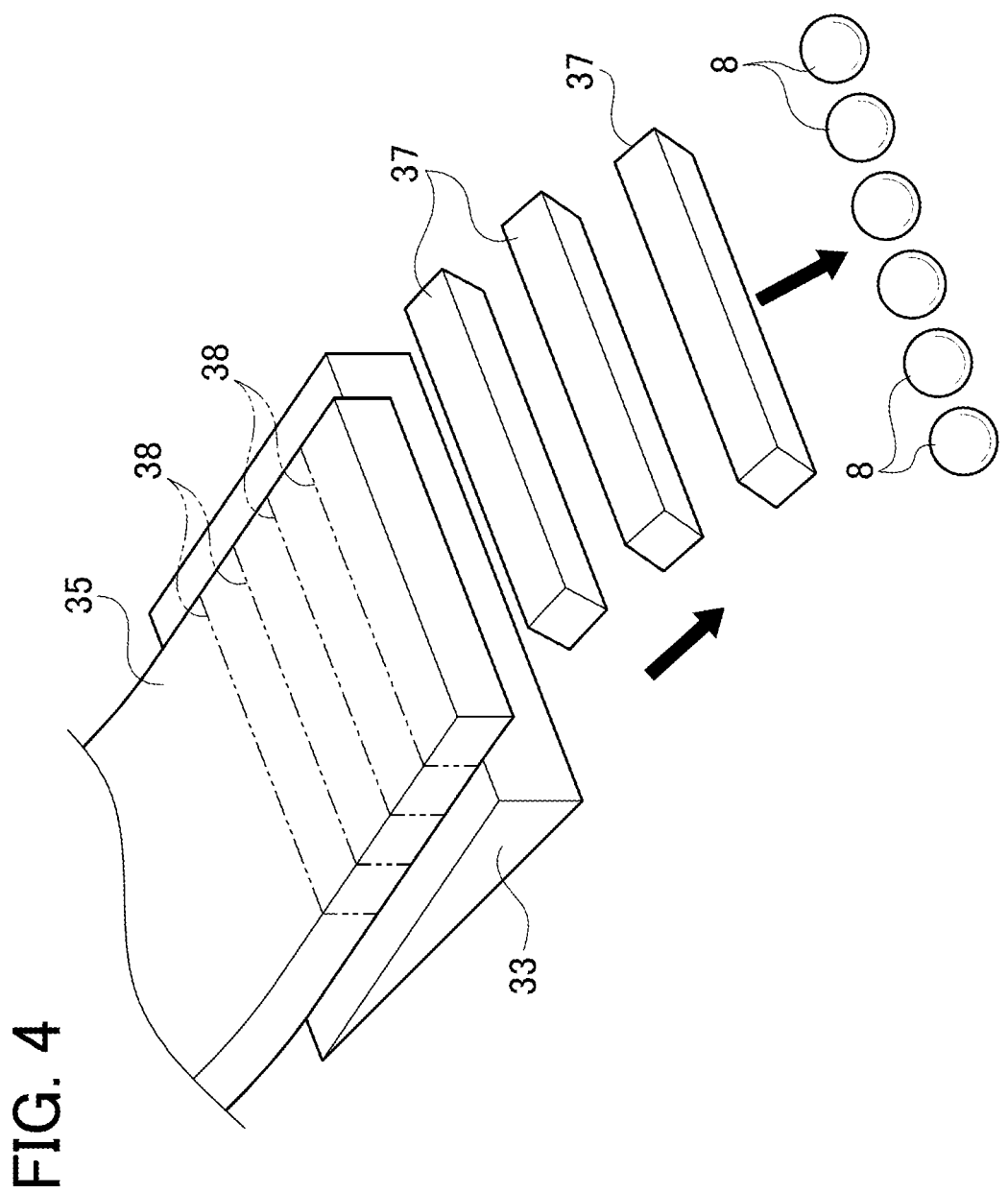
FIG. 4 is a perspective view showing a process of cutting a plate-like formed product of a wet powder body into a bar-like shape and further cutting into grains.

The plate-like shape forming in (2-1) and the bar-like shape cutting in (2-2) are prescribed as a bar-like shape forming process of forming the assembly 34 of the wet powder body into the bar-like shape. The cutting lines 38 in FIG. 4 are imaginary lines for indicating cutting points, and the actual formed product 35 has no such lines depicted. A thickness of each of the bar-like formed products 37 obtained as above is stable and has less variations. This is because the thickness of the plate-like formed product 35 prior to cutting is stably uniform, and further because a cutting width can be prescribed by the rotation speed of the rotary cutter 36.

Figure 5:
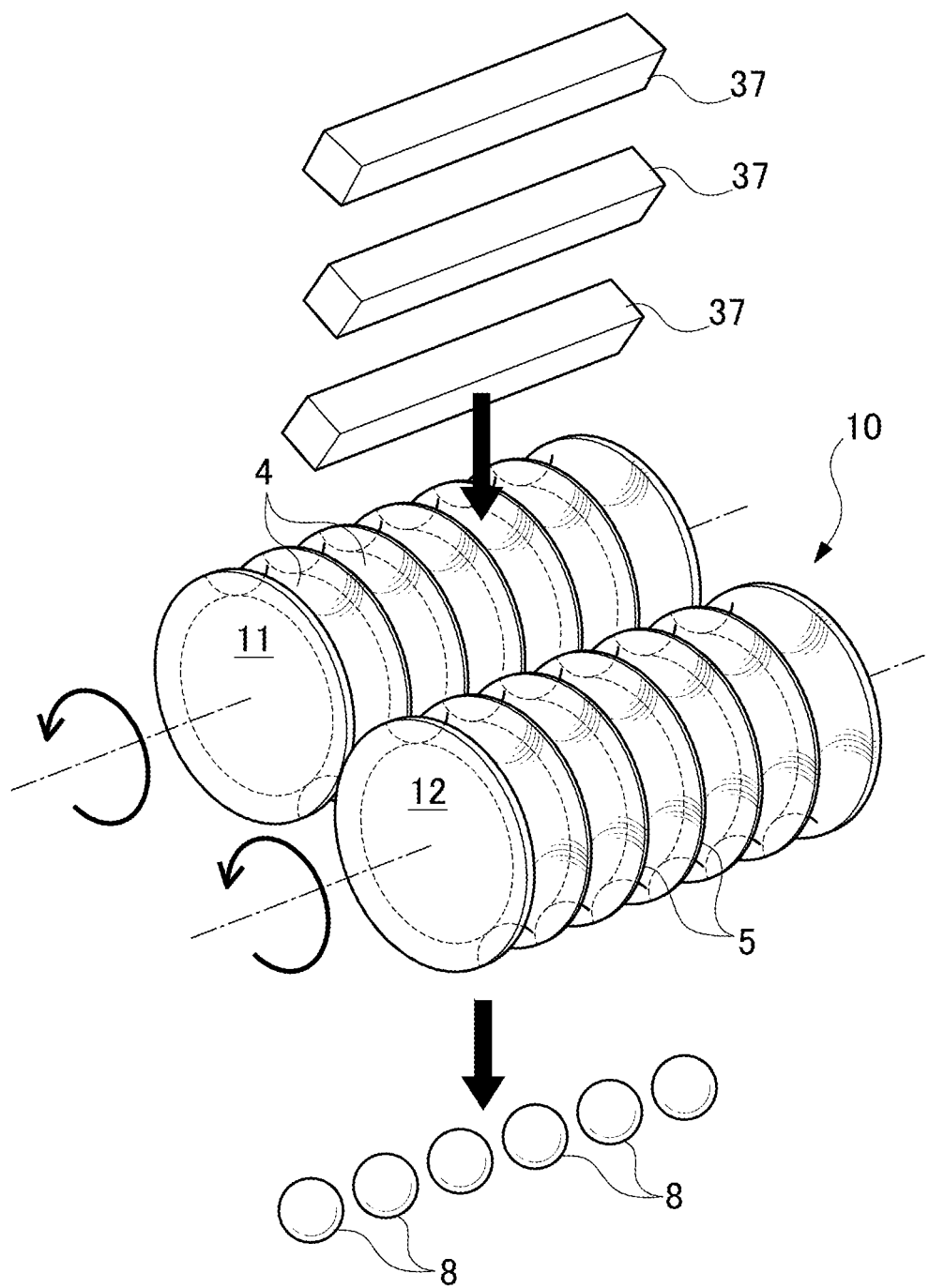
FIG. 5 is a perspective view of a grain-like shape cutting process and an apparatus therefor in the embodiment.

The grain-like shape cutting in (2-3) is a process of cutting the bar-like formed products 37 into grains. This process can be performed by use of a grain-like shape cutting apparatus 10 shown in FIG. 5. The grain-like shape cutting apparatus 10 is provided with a first blade-equipped roller 11 and a second blade-equipped roller 12. Both the first blade-equipped roller 11 and the second blade-equipped roller 12 are both formed with a plurality of circumferential grooves on their surfaces. Each protruding portion 5 between the grooves 4 is of a blade-like shape. In the grain-like shape cutting apparatus 10, the protruding portions 5 of the first blade-equipped roller 11 and the protruding portions 5 of the second blade-equipped roller 12 are configured to face each other on facing portions of the first blade-equipped roller 11 and the second blade-equipped roller 12.

In the grain-like shape cutting apparatus 10, the bar-like formed products 37 are put into the facing portions of the first blade-equipped roller 11 and the second blade-equipped roller 12 so that the bar-like formed products 37 are cut. Each of the bar-like formed products 37 is put in a manner that a longitudinal direction of the formed product 37 is arranged in parallel to axial directions of the first blade-equipped roller 11 and the second blade-equipped roller 12. Thus, each of the bar-like formed products 37 is cut into grains at abutting portions of the protruding portions 5.

Each width of the grooves 4 in the first blade-equipped roller 11 and the second blade-equipped roller 12, namely each space between the protruding portions 5 is preferably arranged almost same with a diameter of the wet granular body which is to be finally obtained. Thus, a formed product 8 with desired grain size can be obtained. A sectional shape of the grooves 4 is preferably of semi-circle. A radius of curvature of the semi-circle in this case is preferably set to be almost same with a radius of the wet granular body which is to be finally obtained. Accordingly, the formed product 8 is not necessarily formed as a perfect sphere, but the product 8 can be of a round shape with its corners being mostly rounded.

In the grain-like shape cutting apparatus 10, further, the first blade-equipped roller 11 and the second blade-equipped roller 12 are configured to rotate at different peripheral speeds. Accordingly, the formed product 8 cut by the protruding portions 5 is rotated as influenced by the difference of the moving speeds between the rollers. The grain-like formed product 8 is thus further rounded. This is the grain-like shape cutting process in the present embodiment. Hereinafter, the grain-like formed product 8 is referred to as a wet granular body 8. The wet granular body 8 obtained as mentioned above has less variations in the grain diameter. This is because a thickness of the original bar-like formed product 37 is stable and cutting gaps are determined by spaces of the protruding portions 5.

An electrode plate can be manufactured by use of the wet granular body 8 of the electrode active material mixture which is obtained as mentioned above. Manufacturing of the electrode plate can be performed by use of a three-piece-roller apparatus 20 shown in FIG. 6. The three-piece-roller apparatus 20 in FIG. 6 includes a first roller 21, a second roller 22, and a third roller 23. The second roller 22 faces both the first roller 21 and the third roller 23, but the first roller 21 and the third roller 23 do not face each other. A current collecting foil 24 is put on the third roller 23. The current collecting foil 24 is conveyed to pass through facing portions of the second roller 22 and the third roller 23.

Figure 6:
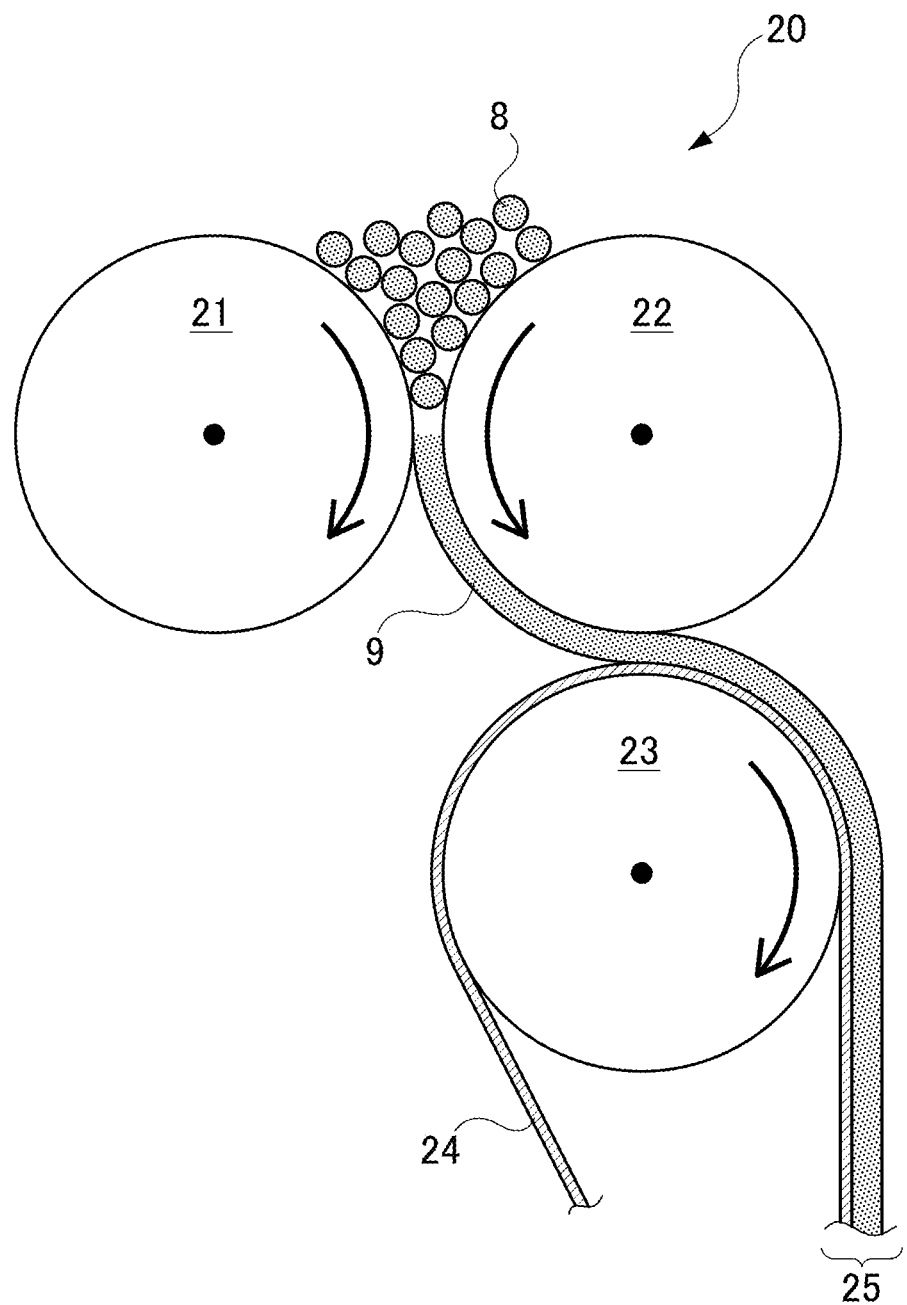
FIG. 6 is a schematic diagram showing a manufacturing process of an electrode plate in the embodiment.

In the three-piece-roller 20 in FIG. 6, a large number of the above-mentioned wet granular bodies 8 are supplied to facing portions of the first roller 21 and the second roller 22 from each upstream side of their rotating directions. The wet granular bodies 8 are dragged into the facing portions of the first roller 21 and the second roller 22 by their rotation and flattened to be in a layer form (a layer formation process). A layer 9 of the electrode active material mixture formed by flattening is placed and proceeds on a surface of the second roller 22 which is faster in its peripheral speed.

The layer 9 on the surface of the second roller 22 reaches facing portions of the second roller 22 and the third roller 23 and is then transferred on a side of the third roller which is further faster in its peripheral speed (a transferring process). The current collecting foil 24 is put on the third roller 23, and thus, the layer 9 is overlapped on the current collecting foil 24 and proceeds further. Accordingly, an electrode plate 25 including the layer 9 of the wet body of the electrode active material mixture on the current collecting foil 24 can be manufactured. According to this method of the present embodiment, the layer 9 with a uniform thickness can be stably formed. Uniform grain size of the wet granular bodies 8 leads to easy supply of wet body with no excess and deficiency by restricting a supply number of the wet granular bodies 8 per each unit of length to the facing portions of the first roller 21 and the second roller 22.

According to the present embodiment explained in detail above, the mixture having less liquid component ratio to be in the pendular state is firstly formed into a plate-like shape, then cut into bar-like pieces, and further cut into grains to obtain the wet granular bodies 8. Further, cutting the bar-like formed product 37 of the wet body into grains is performed by use of the grain-like-shape cutting apparatus 10 including the blade-equipped rollers 11 and 12. Thereby, from the wet powder with less fluidity as the raw material, the wet granular bodies 8 with uniform grain size can be stably manufactured. This manufacturing can be achieved irrespective of the compounding ratio of the conductive material included in the electrode active material mixture. In this manner, the manufacturing method for the wet granular body of the electrode active material mixture obtained from the granular bodies with almost uniform grain size irrespective of the compounding ratio of the conductive material, the wet granular body itself, the manufacturing method for the electrode plate using the wet granular body, and the manufacturing apparatus for the wet granular body are realized.

The present embodiment and examples are only illustration, and have no any limitation to the present disclosure. Therefore, the present disclosure may naturally be made with improvements and modifications without departing from the scope of the disclosure. For example, the above explanation has been made with an example used for a positive electrode plate of a lithium-ion battery, but the present disclosure is applicable for different types of batteries and different polarity as long as the method utilizes an electrode active material, a conductive material, and a disperse medium. Other types of additive powder body other than the conductive material may be included.

Apparatuses indicated in the respective manufacturing processes may be another configuration having similar functions. Especially, in the grain-like shape cutting apparatus 10 in FIG. 5, two rollers do not need to be the blade-equipped rollers. The present disclosure can be achieved with a configuration that one roller is equipped with a blade and the other one is simply formed as a columnar roller.

REFERENCE SIGNS LIST

1 Solid
2 Liquid component
4 Groove
5 Protruding portion
8 Grain-like formed product
9 Layer of wet body
10 Grain-like-shape cutting apparatus
11 First blade-equipped roller
12 Second blade-equipped roller
20 Three-piece-roller apparatus
21 First roller
22 Second roller
23 Third roller
24 Current collecting foil
25 Electrode plate
34 Assembly of wet powder bodies
35 Plate-like formed product
37 Bar-like formed product

What is claimed is:

1. A method for manufacturing a wet granular body of an electrode active material mixture, the method comprising:
   mixing solid-matter powders including at least electrode active material powder and conductive material powder with a liquid component to obtain a wet powder body in a pendular state in which the liquid component includes a plurality of liquid bridges that each extend between facing portions of two particles of a plurality of particles of the solid-matter powders, wherein none of the plurality of liquid bridges of the liquid component are linked to another one of the plurality of liquid bridges, and there are vacant spaces distributed among the solid-matter powders and between the liquid bridges throughout the entirety of the wet powder body; and
   granulating the wet powder body into grains to obtain the wet granular body of the electrode active material mixture, wherein:
      the granulating includes:
         forming the wet powder body into a shape of a bar, and
         cutting the wet powder body, which has been formed into the shape of a bar, into grains at plural points in a longitudinal direction of the wet powder body, and
      forming the wet powder body into the shape of a bar includes:
         forming the wet powder body into a shape of a plate; and
         cutting the wet powder body, which has been formed into the shape of a plate, along plural cutting lines arranged parallel to one another to form a plurality of pieces each having the shape of a bar.

2. A method for manufacturing an electrode plate having layers of the wet granular body of an electrode active material mixture on a current collecting foil, the method using a three-piece roller including a first roller, a second roller, and a third roller, the three-piece roller configured such that the second roller faces both the first roller and the third roller, the first roller and the third roller are not facing each other, and the current collecting foil is placed on the third roller to pass through facing portions of the second roller and the third roller, the method comprising:
    forming a laminated layer of the wet granular body on a surface of the second roller by supplying the wet granular body of the electrode active material mixture to pass through facing portions of the first roller and the second roller; and
    transferring the laminated layer from the surface of the second roller to a surface of the current collecting foil while the laminated layer is passing through the facing portions of the second roller and the third roller, wherein
    the method uses the wet granular body manufactured by the method according to claim 1 as the wet granular body of the electrode active material mixture.

* * * * *